United States Patent Office 2,794,806
Patented June 4, 1957

2,794,806

N-SUBSTITUTED PIPERIDINES

Edward U. Elam and Robert H. Hasek, Kingsport, Tenn., assignors to Eastman Kodak Company, Rochester, N. Y., a corporation of New Jersey No Drawing. Application April 29, 1954,
Serial No. 426,584

3 Claims. (Cl. 260—293.2)

The present invention relates to an improved method for the preparation of N-substituted piperidines, particularly N-alkylpiperidines, and to novel N-alkylpiperidinealkanols prepared thereby. More particularly, the invention is concerned with the preparation of N-substituted piperidines by reductive alkylation of primary amines with glutaraldehydonitrile and derivatives thereof.

N-substituted piperidines are known to have utility for many purposes. These compounds are of value in the manufacturing of pharmaceutical agents, oxidation inhibitors and many other useful products. For instance the compound 4,4-dimethyl-1-(p-hydroxyphenyl)piperidine, is a gasoline antioxidant, and the hydrochloride of the benzoic acid ester of 2-methyl-1-piperidine-propanol is piperocaine hydrochloride, a well-known local anesthetic.

The prior art discloses a number of syntheses for N-substituted piperidines. For example, certain of these methods are disclosed by Yur'ev et al. J. Gen. Chem. (U. S. S. R.) 9, 590–594 (1939), by Schwoegler et al., J. Am. Chem. Soc. 61, 3499–3502, by Barr et al., J. Chem. Soc. 1945, 438–441, by Paden et al., J. Am. Chem. Soc. 58, 2487–2499 (1936), by Bergel et al., U. S. Patent 2,405,555, by Kharasch et al., U. S. Patent 2,409,287, and by Reynolds et al., U. S. Patent 2,581,443. However, so far as we are aware, N-substituted piperidines have never been prepared by reductive alkylation of straight chain aldehydes.

Reductive alkylation is the term applied to the process of introducing alkyl groups into ammonia or a primary or secondary amine by means of an aldehyde or ketone in the presence of a reducing agent. The preparation of secondary and tertiary amines by reduction of an aldehyde in the presence of a primary amine is a well-known reaction.

We now have found that N-substituted piperidines may be easily prepared by reductive alkylation of primary amines with glutaraldehydonitriles. By means of our process we have been able to synthesize a novel class of compounds, i. e. 3,3-dimethylpiperidinealkanols.

It is therefore an object of the present invention to provide a new and highly convenient method for the preparation of N-substituted piperidines and particularly to provide a convenient means for preparation of piperidine derivatives in which the N-substituent is determined by the radical of the particular primary amine used in the synthesis. It is a special object of the invention to provide a novel method for the preparation of N-substituted piperidines having an N-alkyl, N-cycloalkyl or an N-aryl substituent. A further object of the invention is to provide novel N-alkylpiperidinealkanols. Still another object of the invention is the method for preparation of N-alkylpiperidines by reductive alkylation of primary amines with glutaraldehydonitrile or derivatives thereof. A further object is to prepare N-substituted piperidines in which the N-alkyl and N-aryl or N-cycloalkyl groups contain other reactive functional groups such as hydroxy, alkoxy or carboalkoxy groups. Other objects will be understood from the accompanying specification and claims.

In accordance with our invention a method for the preparation of N-substituted piperidines comprises the step of reducing a composition selected from the group consisting of admixtures and condensation products of a glutaraldehydonitrile with a primary amine. The method may be carried out by forming a liquid reaction mixture of the primary amine and the glutaraldehydonitrile and concurrently or subsequently subjecting the reaction mixture to reducing conditions, most advantageously catalytic hydrogenation using hydrogen in the presence of certain metallic hydrogenation catalysts. The reaction may be represented by the empirical equation:

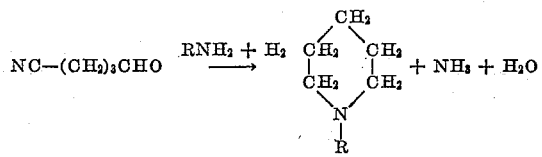

in which R represents a hydrocarbon radical selected from the group consisting of alkyl radicals, cycloalkyl radicals and aryl radicals. The hydrocarbon radical may be substituted with hydroxyl, alkoxyl and carboalkoxyl groups and in one of its most advantageous embodiments the invention contemplates the synthesis of novel N-alkanol piperidines, e. g. 3,3-dimethyl-1-piperidineethanol.

The exact nature of the liquid reaction mixture of primary amine and glutaraldehydonitrile is not fully understood by us. However, it is believed that in the carrying out of a catalytic hydrogenation on the reaction mixture, piperidines result from the materials present whether the latter exist as substances originally introduced or as intermediate reaction products. It is possible that at least two types of intermediate products may be formed prior to or during hydrogenation as described by Emerson, "Organic Reactions," vol. IV, page 175.

In any event it sometimes may be possible to drive off some of the by-product water prior to introduction of the hydrogen. Where possible, this seems desirable since it sometimes appears to result in higher conversions. It is convenient to conduct this step in a suitable solvent, such as benzene or toluene, with which the water forms an azeotrope. The water may thus be removed by distillation, condensation of the azeotrope, removal of the water layer, and recycle of the benzene or toluene to the reaction solution. The hydrogen then may be introduced in the presence of the remaining solvent without deleterious effects unless the conditions and solvent are such that undesirable side reactions occur, viz. hydrogenation of benzene. Where side reactions due to the solvent must be avoided, the first solvent may be removed and replaced with a more suitable material, for example, an alcohol such as methanol or ethanol. Thus it is often better to practice the invention by subjecting a freshly formed liquid reaction mixture of the primary amine and the glutaraldehydonitrile to immediate hydrogenation. Therefore, the term "liquid reaction mixture" as used in the claims will be understood to mean liquid mixtures of the primary amine and the aldehydonitrile, with or without an added solvent and regardless of whether some or all of the amine or aldehydonitrile has been subjected to intermediate chemical changes.

The present invention contemplates the use of glutaraldehydonitrile and derivatives thereof in which one or more hydrogen atoms of the methylene groups are replaced by lower alkyl groups such as methyl, ethyl, propyl, or butyl groups. Thus, this invention includes the use of γ,γ-dialkylglutaraldehydonitriles, such as γ,γ-dimethylglutaraldehydonitrile, γ-methyl-γ-propylglutaraldehydonitrile, γ,γ-diethylglutaraldehydonitrile, and γ-butyl-γ-ethylglutaraldehydonitrile, which are readily prepared by cyanoethylation of isobutyraldehyde and other common dialkyl acetaldehydes. Glutaraldehydonitriles with substituent alkyl groups in the α- or β-positions may also be used in the practice of this invention.

The primary amines applicable in this invention include simple aliphatic amines, such as methylamine and isopropylamine; alicyclic amines, such as cyclopentylamine and cyclohexylamine; aromatic amines, such as aniline and the toluidines; and amines containing other reactive functional groups, particularly hydroxyl, alkoxyl, and carboalkoxyl groups. Representative amines of this last group include, for example, 2-aminoethanol, 3-aminopropanol, 2,2-diethyl-3-aminopropanol, p-aminophenol, and their ethers and esters. The primary amine preferably is used in an amount which, on a molar basis, is equivalent to or in excess of the amount of the glutaraldehydonitrile used.

Suitable catalysts for the hydrogenation are finely divided metallic nickel, cobalt, iron, platinum, or palladium, in such forms as Raney nickel, reduced sintered cobalt oxides, nickel supported on kieselguhr, colloidal platinum, amorphous platinum from reduction of platinum oxide, palladium supported on charcoal, etc. Hydrogen is employed at atmospheric or superatmospheric pressures and at normal or elevated temperatures, depending on the acitivity of the hydrogenation catalyst. For instance, the noble metal catalysts, platinum and palladium, are effective at relatively low pressures and temperatures; the base metal catalysts, nickel, cobalt and iron, usually require elevated temperatures and pressures, in the ranges of 50 to 250° C. and 500 to 5000 p. s. i.

Several embodiments of the invention are illustrated in the following examples.

*Example 1.—Preparation of 3,3-dimethyl-1-piperidineethanol*

A solution of 63 g. of γ,γ-dimethylglutaraldehydonitrile and 31 g. of 2-aminoethanol in 100 cc. of benzene was refluxed under a water trap for thirty minutes, during which time 9 cc. of water was collected. The benzene was removed on a steam bath, the residue was dissolved in 100 cc. of ethanol, and the solution was placed in a 1020-cc. stainless steel rocking type autoclave with 20 g. of Raney nickel. The mixture was treated with hydrogen at 175° C. and 3400 p. s. i. pressure for three hours.

The reaction mixture was filtered and fractionated at atmospheric pressure, to give 37 g. (47% of the theoretical amount) of 3,3-dimethyl-1-piperidineethanol, boiling at 207–215°, $n_D^{20}$ 1.4658, $d_4^{20}$ 0.9257.

*Example 2.—Preparation of 3,3-dimethyl-1-piperidinepropanol*

A solution of 63 g. of γ,γ-dimethylglutaraldehydonitrile and 37.5 g. of crude 3-aminopropanol in 100 cc. of benzene was refluxed under a water trap until no more water separated (one hour). The water collected amounted to 6.3 g. (70% of the theoretical amount). The benzene was stripped off on a steam bath, the residue was taken up in 100 cc. of ethanol, and the solution was hydrogenated as in Example 1.

The reaction mixture was filtered and distilled under reduced pressure. 3,3-dimethyl-1-piperidinepropanol was received at 108–113° C. (10 mm.), $n_D^{20}$ 1.4665, $d_4^{20}$ 0.9187.

*Example 3.—Preparation of β,β-diethyl-3,3-dimethyl-1-piperidinepropanol*

A solution of 63 g. of γ,γ-dimethylglutaraldehydonitrile and 75 g. of 2-aminomethyl-2-ethyl-1-butanol in 250 cc. of ethanol was placed in a 1020-cc. stainless steel rocking type autoclave with 20 g. of Raney nickel and was hydrogenated at 175° and 2500–2800 p. s. i.

pressure. The product was filtered and distilled under reduced pressure to give 54.7 g. (41% of the theoretical amount) of β,β-diethyl-3,3-dimethyl-1-piperidinepropanol, boiling at 120–130° C. (5 mm.).

*Example 4.—Preparation of 3,3-dimethyl-1-(p-hydroxyphenyl) piperidine*

A solution of 31.2 g. of γ,γ-dimethylglutaraldehydonitrile and 27.3 g. of p-aminophenol in 100 cc. of xylene was refluxed under a water trap until no more water separated. The substance which crystallized on cooling, was removed by filtration and after two crystallizations from aqueous alcohol it was reduced to 3,3-dimethyl-1-(p-hydroxyphenyl)piperidine by hydrogenation as in Example 1.

We claim:
1. A method for the preparation of an N-substituted piperidine comprising the steps of forming a liquid reaction mixture of a primary amine having the formula RNH₂ in which R is a radical selected from the group consisting of methyl, isopropyl, cyclopentyl, cyclohexyl, phenyl and tolyl radicals, and hydroxy, alkoxy, and carboalkoxy derivatives thereof, and a compound selected from the group consisting of glutaraldehydonitrile and derivatives thereof which consists of glutaraldehydonitrile having one to six hydrogen atoms of the methylene groups thereof substituted by a lower alkyl group, subjecting the mixture to a catalytic hydrogenation in the presence of an inert solvent, and recovering an N-substituted piperidine from the hydrogenated reaction mixture.

2. A method for the preparation of an N-substituted piperidine comprising the steps of forming a liquid reaction mixture of a glutaraldehydonitrile selected from the group consisting of γ,γ-dimethyl-, γ-methyl-γ-propyl-, γ-butyl-γ-ethyl-, and γ,γ-diethylglutaraldehydonitrile and a primary amine selected from the group consisting of:

Methyl amine
Isopropyl amine
Cyclopentyl amine
Cyclohexyl amine
Aniline
2-aminoethanol
3-aminopropanol
2,2-diethyl-3-aminopropanol
p-Aminophenol
2-aminomethyl-2-ethyl-1-butanol subjecting the mixture to a catalytic hydrogenation in the presence of an inert solvent, and recovering an N-substituted piperidine from the hydrogenated reaction mixture.

3. A method for preparing 3,3-dimethyl-1-piperidineethanol comprising the steps of forming a liquid reaction mixture of γ,γ-dimethylglutaraldehydonitrile and 2-aminoethanol, refluxing the mixture to remove water, and subsequently treating the mixture with hydrogen at 175° C. and a pressure of 3400 p. s. i. in the presence of a Raney catalyst.

References Cited in the file of this patent
UNITED STATES PATENTS

| | | |
|---|---|---|
| 2,342,607 | Bruson | Feb. 22, 1944 |
| 2,496,958 | Reitsenna | Feb. 7, 1950 |
| 2,590,125 | Robinson | Mar. 5, 1952 |

OTHER REFERENCES

Paden, et al.: Journal of the American Chemical Society, vol. 58, pages 2487–2499, 1936.

Thayer, et al.: Journal of the American Chemical Society, vol. 50, pages 3348–3355, 1928.

Wheatley, et al.: Journal of the American Chemical Society, vol. 74, pages 1359–1361.